United States Patent
Drewes et al.

(10) Patent No.: US 9,487,945 B2
(45) Date of Patent: Nov. 8, 2016

(54) TRANSITION BODY FOR ARRANGING BETWEEN DIFFERENTLY DESIGNED SECTIONS OF A WIND POWER PLANT TOWER AND WIND POWER PLANT TOWER WITH SUCH A TRANSITION BODY

(71) Applicant: THYSSENKRUPP STEEL EUROPE AG, Duisburg (DE)

(72) Inventors: Stephan Drewes, Mönchengladbach (DE); Mark Hirt, Bochum (DE); Adrian Paton, Dinslaken (DE); Konstantinos Savvas, Oberhausen (DE); Frank Schilling, Bottrop (DE)

(73) Assignee: THYSSENKRUPP STEEL EUROPE AG, Mönchengladbach (DE)

( * ) Notice: Subject to any disclaimer, the term of this patent is extended or adjusted under 35 U.S.C. 154(b) by 0 days.

(21) Appl. No.: 14/652,629

(22) PCT Filed: Nov. 26, 2013

(86) PCT No.: PCT/EP2013/074667
§ 371 (c)(1),
(2) Date: Aug. 18, 2015

(87) PCT Pub. No.: WO2014/095252
PCT Pub. Date: Jun. 26, 2014

(65) Prior Publication Data
US 2015/0354203 A1    Dec. 10, 2015

(30) Foreign Application Priority Data

Dec. 17, 2012  (DE) .......................... 10 2012 112 415

(51) Int. Cl.
*E04B 1/41* (2006.01)
*E04H 12/08* (2006.01)
*E04H 12/34* (2006.01)

(52) U.S. Cl.
CPC ................ *E04B 1/40* (2013.01); *E04H 12/08* (2013.01); *E04H 12/34* (2013.01); *F03D 13/20* (2016.05);
(Continued)

(58) Field of Classification Search
CPC ..... E04B 1/40; E04B 2103/06; E04H 12/34; E04H 12/08; F03D 11/04; Y02P 70/523; Y02E 10/728; F05B 2240/9121; F05B 2230/232

USPC ............ 52/651.01, 651.02, 651.03, 651.04, 52/651.07, 843, 844, 845, 848; 416/DIG. 6; 248/127
See application file for complete search history.

(56) References Cited

U.S. PATENT DOCUMENTS 4,403,916 A * 9/1983 Skelskey ............... F03D 7/0212
                                                                416/14
5,832,688 A * 11/1998 Crissey .................. E04H 12/10
                                                                52/638

(Continued)

FOREIGN PATENT DOCUMENTS

| EP | 2072685 | 6/2009 |
| EP | 2333163 | 6/2011 |

(Continued)

OTHER PUBLICATIONS

PCT International Search Report mailed Feb. 20, 2014 for PCT International Application No. PCT/EP2013/074667 with English Translation, 7 pages.

*Primary Examiner* — Brent W Herring
(74) *Attorney, Agent, or Firm* — Remarck Law Group PLC

(57) ABSTRACT

The invention concerns a transition body arranged between a lower section and an upper section of a tower for a wind energy plant. The lower tower section is constructed from several corner posts configured as hollow profiles and the upper tower section is configured in the form of a tubular tower which is essentially round in cross section, with a bottom and a connection flange disposed above the bottom for connecting the upper tower section. The bottom and the flange connect the upper tower section and are joined together by at least one metal casing sheet. The connection of the bottom to the at least one metal casing sheet is a welded construction. A number of connection areas is provided on the underside of its bottom, corresponding to the number of corner posts of the lower tower section.

17 Claims, 5 Drawing Sheets

(52) U.S. Cl.
CPC ...... *E04B 2103/06* (2013.01); *F05B 2230/232* (2013.01); *F05B 2240/9121* (2013.01); *Y02E 10/728* (2013.01); *Y02P 70/523* (2015.11)

(56) References Cited

U.S. PATENT DOCUMENTS

| | | | |
|---|---|---|---|
| 6,320,273 | B1 | 11/2001 | Nemec |
| 7,694,486 | B2 * | 4/2010 | Murphy ................. B64G 1/222 52/645 |
| 7,735,290 | B2 * | 6/2010 | Arsene ................... F03D 1/001 248/127 |
| 7,993,107 | B2 * | 8/2011 | Gevers ................... F03D 1/001 248/163.1 |
| 8,544,214 | B2 * | 10/2013 | Bagepalli ................ E02D 27/42 248/163.1 |
| 2006/0267348 | A1 * | 11/2006 | Weitkamp ............... E02D 27/42 290/55 |
| 2009/0249707 | A1 * | 10/2009 | Curme ................... E04H 12/10 52/40 |
| 2014/0230365 | A1 * | 8/2014 | Hemphill ................ E04C 3/30 52/843 |

FOREIGN PATENT DOCUMENTS

| | | |
|---|---|---|
| EP | 2388479 | 11/2011 |
| EP | 2597227 | 5/2013 |
| GB | 2476051 | 6/2011 |
| WO | 2005040605 | 5/2005 |

* cited by examiner

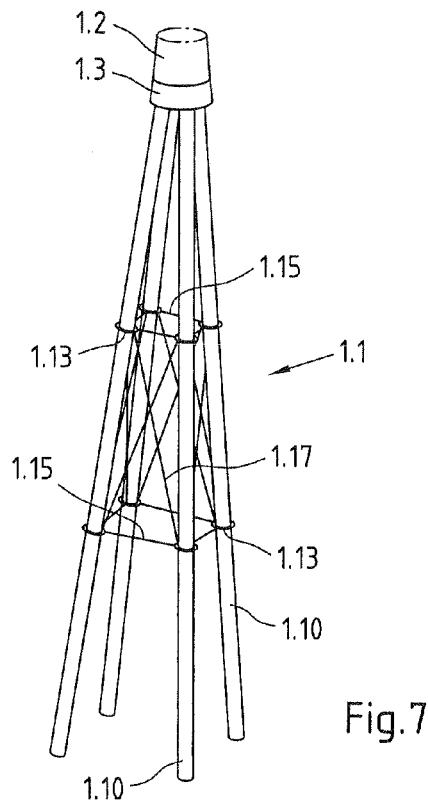
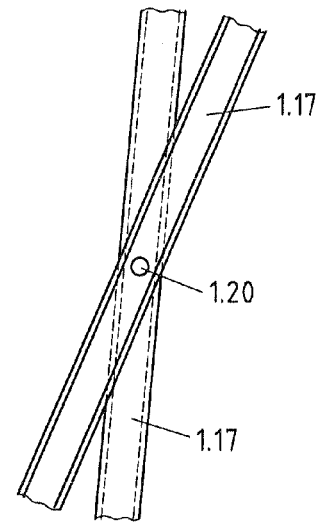
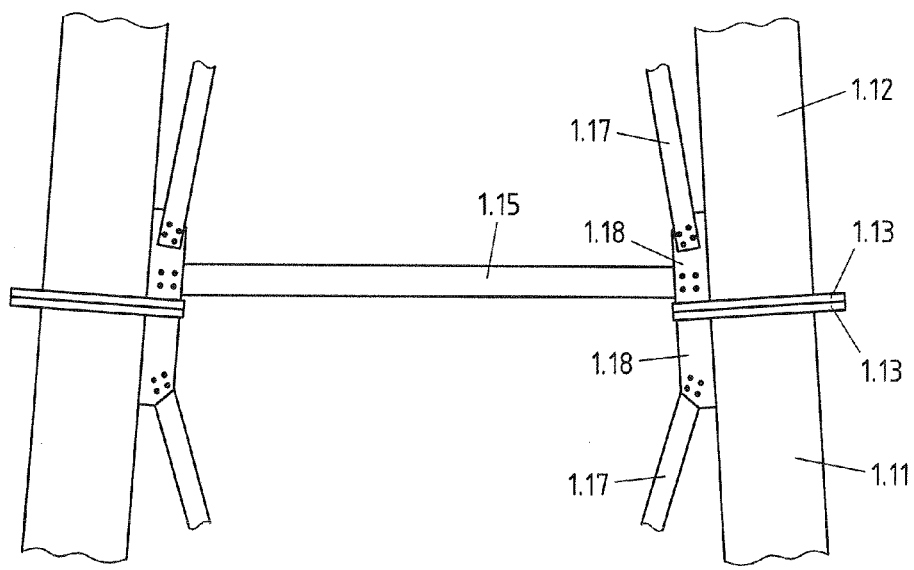
Fig. 7
Fig. 9
Fig. 8

TRANSITION BODY FOR ARRANGING BETWEEN DIFFERENTLY DESIGNED SECTIONS OF A WIND POWER PLANT TOWER AND WIND POWER PLANT TOWER WITH SUCH A TRANSITION BODY

CROSS-REFERENCE TO RELATED APPLICATIONS

This application is a 371 U.S. National Stage of International Application No. PCT/EP2013/074667, filed Nov. 26, 2013, which claims priority to German Application No. DE102012112415.9 filed on Dec. 17, 2012. The disclosure of each of the above applications is incorporated herein by reference in their entirety.

FIELD

The present disclosure concerns a transition body arranged between a lower section and an upper section of a tower for a wind energy plant.

BACKGROUND

The development of wind energy plants being constructed inland is making use of increasingly higher hub heights above 100 m, in order to utilize the higher and more constant wind speeds and thus improve the efficiency of these wind energy plants. Higher tubular towers with larger and more powerful rotors and generators, however, require at the same time an increased wall thickness and diameter of the tower segments, in order to meet the resulting larger structural mechanics requirements such as rigidity, buckling safety, and endurance strength. But the increasing of the diameter of the tower segments means that the transport of the prefabricated tubular tower segments is no longer possible on many roads due to restrictions, such as bridge clearance of 4.4 m, with the conventional transversely oriented mode of construction.

One possible approach to a solution, proposed for example in DE 603 17 372 T2 and also in WO 2009/048955 A1, is the so-called lengthwise oriented mode of construction, especially in the lower tower region, where the diameters of the finished tubular tower segments are ultimately more than 4.4 m. In this case, tubular tower sections are assembled only at the construction site, i.e., the location of the wind energy plant, from several arc-shaped shell segments and the tubular (annular) tower segments so produced are connected to the full tower. To avoid welding at great height, the shell segments are provided with perforated horizontal and vertical flanges in the tower construction known from DE 603 17 372 T2, enabling a connection of the shell segments by screwing. However, this approach to a solution has some drawbacks. Thus, e.g., in the case of large shell segments, deformations are to be expected from the weight of the shell segments themselves, which can lead to problems of handling and fitting together. On the other hand, when broken up into many small shell segments, the number of screw connections to be made is relatively large, which increases the assembly cost as well as the maintenance cost for tightening up the screws.

Besides wind energy plants with tubular tower and wind energy plants with lattice tower (framework tower), there are also wind energy plants with hybrid construction towers, having a lower lattice tower (framework tower) and an upper tubular tower joined to it.

A tower of a wind energy plant is known from DE 10 2006 056 274 A1, having a lattice tower in the lower part with at least three corner posts and a tubular tower in the upper part with a round cross section, while in the transition zone the upper connection region of the lower part is joined by means of a transition body to the lower connection region of the upper part. The transition body is fashioned as a kind of truncated conical shell, while the respective corner post protrudes into the transition zone and is joined to the outside of the truncated conical shell by two longitudinal weld seams in the transition zone between the upper connection region of the lower part and the lower connection region of the upper part. The corner posts are formed from standardized hollow profiles, preferably steel pipes. Furthermore, the lattice tower has intersecting braces which join the corner posts together.

From DE 103 39 438 A1 there is known a wind energy plant which is likewise constructed from a lower tower section configured as a lattice tower having at least three corner posts and an upper tower section configured as a tubular tower, while a transition piece (transition body) is arranged between the upper and the lower tower section, having a lower region and an upper region, while the lower region can be joined to the lower tower section and the upper region to the upper tower section. The lower region of the transition piece is configured such that its largest horizontal dimension is at least 30% larger than a horizontal dimension of the upper region. The transition piece is configured as a cast iron part or a welded construction.

SUMMARY

The problem which the present invention proposes to solve is to create a wind energy plant tower of the kind mentioned above which has easy transportability of its components, an economical fabrication and a simplified assembly of its components as well as a high rigidity in the assembled state, and especially a relatively uniform flow of forces over the entire height of the tower.

To solve this problem, a transition body is proposed with the features of claim 1. Preferred and advantageous embodiments of the transition body of the invention are indicated in the subclaims.

The transition body according to the invention is characterized in that a number of connection areas are provided on the underside of its bottom, corresponding to the number of corner posts of the lower tower section, while the connection areas are angled relative to each other so that the respective connection area increases radially outward in the assembled state of the transition body.

The transition body creates the connection between the upper tower section in the form of a tubular tower which is basically round in cross section and the lower tower section which is formed from several corner posts configured as hollow profiles. The lower tower section thus defines a tower structure broken up into several legs (corner posts). Preferably, the lower tower section has at least three, especially preferably at least four legs (corner posts). It can thus also have five or six legs (corner posts), in particular.

The design of the transition body according to the invention as a welded construction offers several advantages over a cast iron design. In particular, the welded construction offers the advantage that the necessary structural rigidity and especially bending strength can be achieved with relatively slight material input. The investment costs for the fabrication of the structural parts are considerably less for a welded construction than for a cast iron design, since the large mold construction costs of the cast iron structure disappear. Furthermore, the welded construction offers the benefit of a high flexibility in regard to stiffening options, since for example steel sheets of different thickness and/or material quality can be installed in the transition body. Especially when the transition body is designed as a welded construction there can be several inner plates welded into it for stiffening, while the number, the thickness and/or the material quality of the inner plates can be flexibly selected or adapted appropriately to the stiffness requirements.

The connecting of the corner posts to the underside of the transition body's bottom according to the invention achieves an especially uniform flow of forces from the round tubular tower to the lower tower section with the corner posts.

Due to the fact that the bottom of the transition body according to the invention has on its underside a number of connection areas at an angle to each other, corresponding to the number of corner posts, and oriented so that the particular connection area increases radially outward in the assembled state of the transition body, a direct connection of standard pipes having orthogonal connection flanges as the corner posts is made possible. Thus, no further intermediate elements (adapters) are needed for the connection of standard pipes with orthogonal connection flanges.

One advantageous configuration of the transition body of the invention has the connection flange serving for the connection of the upper tower section arranged on an upper platform, which is situated above the bottom and is likewise connected to the at least one metal casing sheet. The platform improves the stiffness of the transition body under high bending and/or torsional stresses of the tower of the wind energy plant.

Another advantageous embodiment is characterized in that inner plates for stiffening of the transition body are welded onto the at least one metal casing sheet and the top side of the bottom. When the optional upper platform is present, the inner plates are also preferably welded to this platform.

To accomplish a good stiffness with the least possible material input in the interest of minimizing the weight, in another embodiment it is furthermore provided that the inner plates of the transition body according to the invention run essentially radially and vertically.

In regard to an easy assembly of the transition body and the upper tubular tower, as well as further improvement in the stiffness, it is advantageous for the inner plates in another embodiment of the invention to be welded to the metal casing sheet of a shaft defining a vertical passageway, especially a tubular shaft.

Furthermore, it is advantageous for good access during installation if the particular inner plate according to another embodiment has a through opening with a diameter of at least 60 cm.

Moreover, it is advisable for the installation of the upper tubular tower as well as the corner posts when the upper platform has a central through opening and at least one additional through opening at a radial distance thereof. The latter creates an access to the connection areas of the corner posts.

Another embodiment of the transition body of the invention is characterized in that its bottom is composed of platelike segments, and the particular segment has two straight converging side edges. This embodiment is of advantage in the sense of its fabrication, especially in regard to the angled orientation of the connection areas coordinated with the corner posts.

The particular connection area of the bottom of the transition body in another embodiment of the transition body of the invention is preferably provided with fastening boreholes arranged preferably on a circle for the connecting of a corner post. This embodiment enables a reliable fastening of a connection flange arranged on the corner post, preferably welded to it.

In order to make the upper tubular tower as slender as possible on the one hand and on the other hand use standard pipes with relatively large diameter as the corner posts, the transition body of the invention is preferably configured as a truncated cone. Accordingly, the at least one metal casing sheet of the transition body optionally defines the envelope surface of a truncated cone.

In particular, the above-indicated problem is solved by a tower with the features of claim 12.

The corner posts of the tower according to the invention can be composed of several steel pipe profiles joined together in the lengthwise direction, being provided with perforated flanges to accommodate bolts, and the corner posts are joined together by cross struts and/or tension struts connected to the flanges.

The cross struts are preferably also formed from essentially horizontally extending steel profiles. The tension struts (diagonal struts) are preferably formed from diagonally extending steel struts, especially steel profiles, or alternatively from diagonally extending wire cables.

The lower tower section is constructed from several corner posts configured as hollow profiles and the upper tower section is configured in the form of a tubular tower which is essentially round in cross section, with a bottom and a connection flange disposed above the bottom for connecting the upper tower section. The bottom and the flange serving to connect the upper tower section are joined together by at least one metal casing sheet. The connection of the bottom to the at least one metal casing sheet is a welded construction. In particular, the disclosure concerns a tower for a wind energy plant with a lower tower section formed from several corner posts configured as hollow profiles, and an upper tower section in the form of a tubular tower which is essentially round in cross section, wherein the upper tower section and the lower tower section are joined together by a transition body of the aforementioned kind.

DETAILED DESCRIPTION OF THE FIGURES

The invention will now be explained by means of a drawing showing several sample embodiments. There are shown schematically:

FIG. 7 illustrates a lower section of another tower of a wind energy plant according to the invention, in perspective representation;

FIG. 8 illustrates a longitudinal section of the lower tower section of FIG. 7 in the region of the connection of steel pipe profiles of two corner posts, in front view; and FIG. 9 illustrates a section of two interconnected diagonal struts of the lower tower section of FIG. 7.

DETAILED DESCRIPTION

Figure 1:
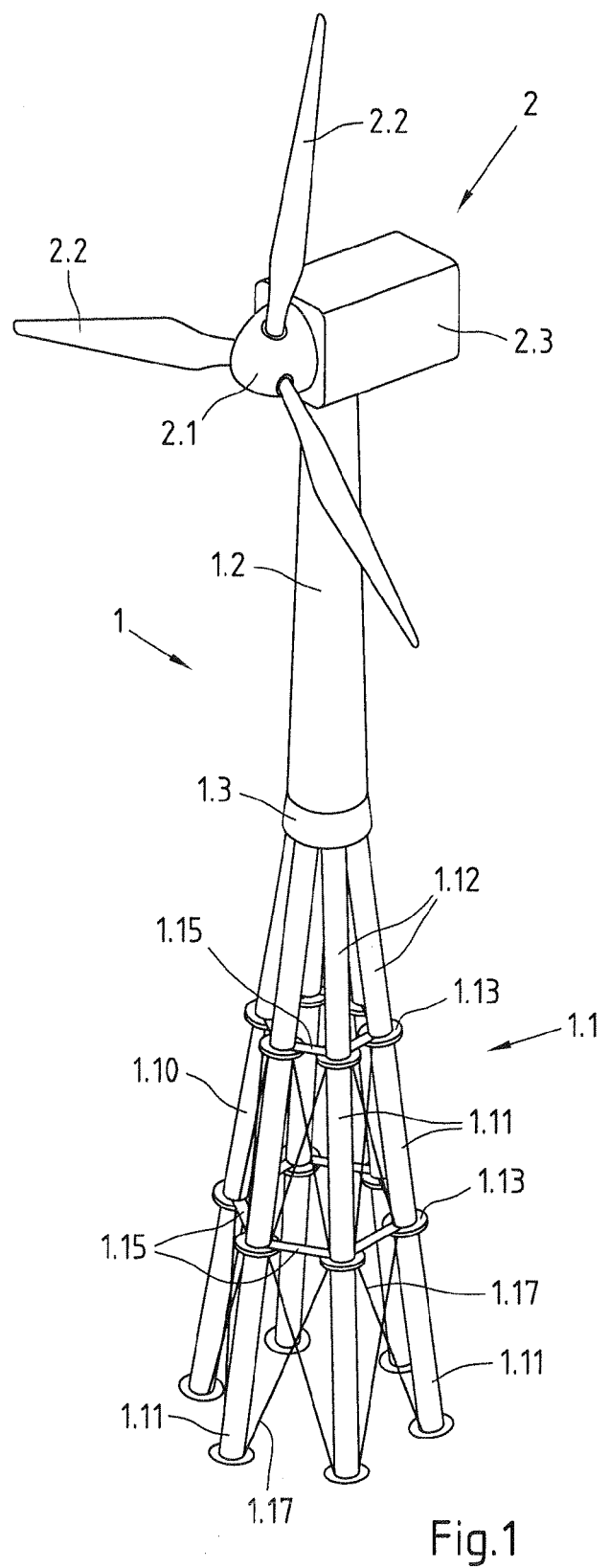
FIG. 1 illustrates a tower of a wind energy plant according to the invention in perspective view.
Figure 2:
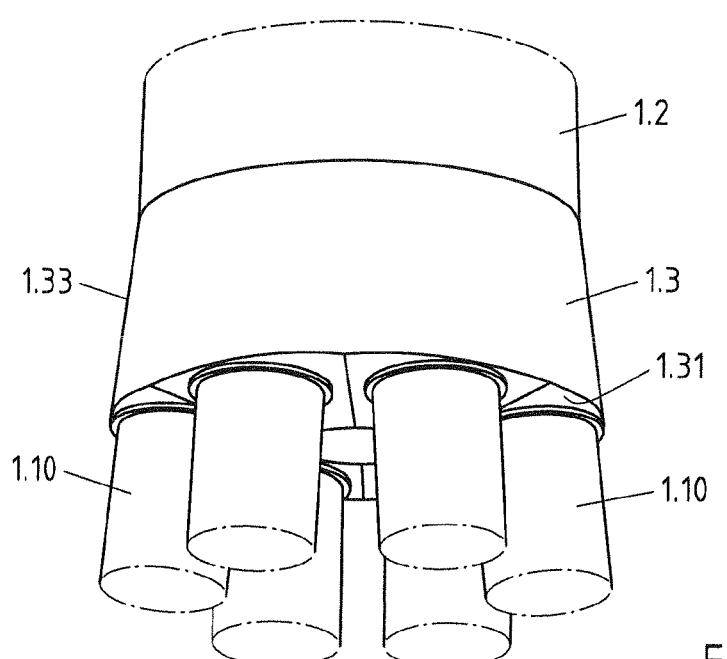
FIG. 2 illustrates a longitudinal section of the tower of FIG. 1 with the transition from the lower tower section having corner posts to the upper round tower.
Figure 3:
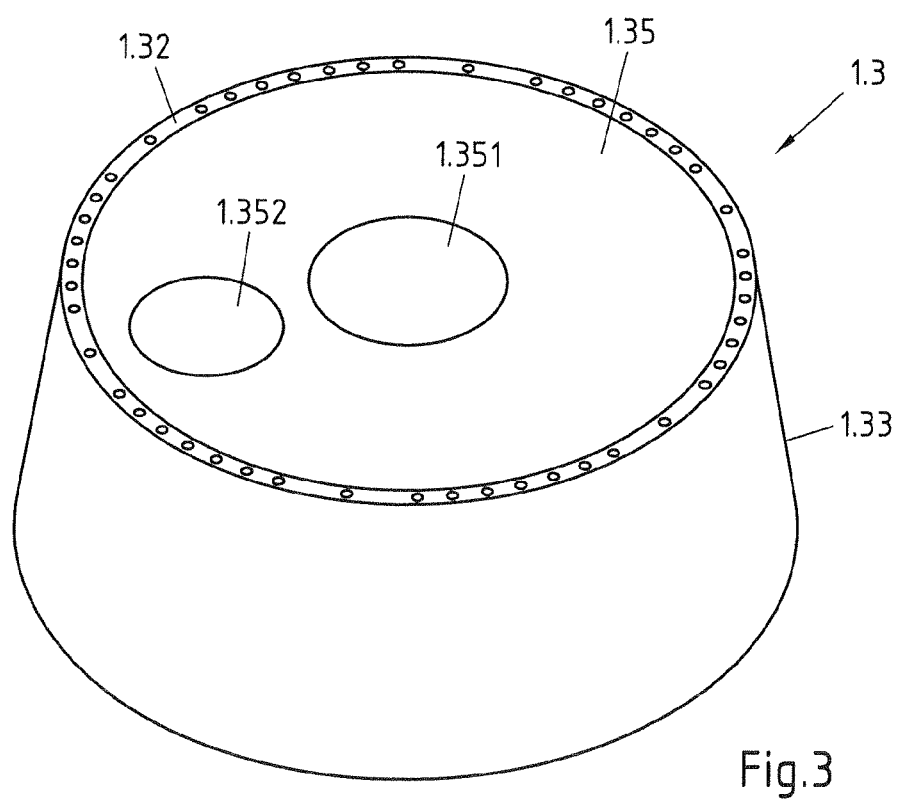
FIG. 3 illustrates the transition body of the tower of FIG. 1, in perspective top view.
Figure 4:
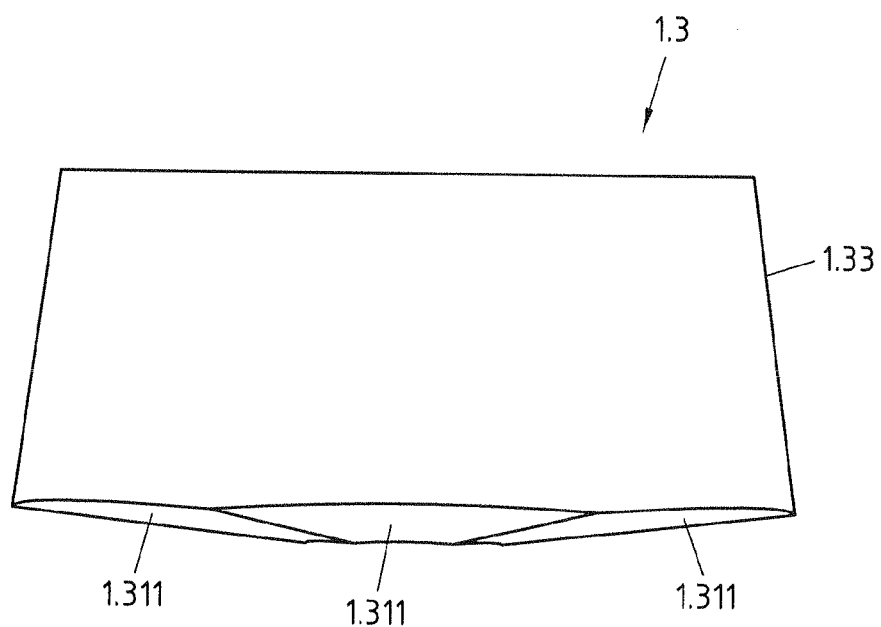
FIG. 4 illustrates the transition body of FIG. 3, in side view.
Figure 5:
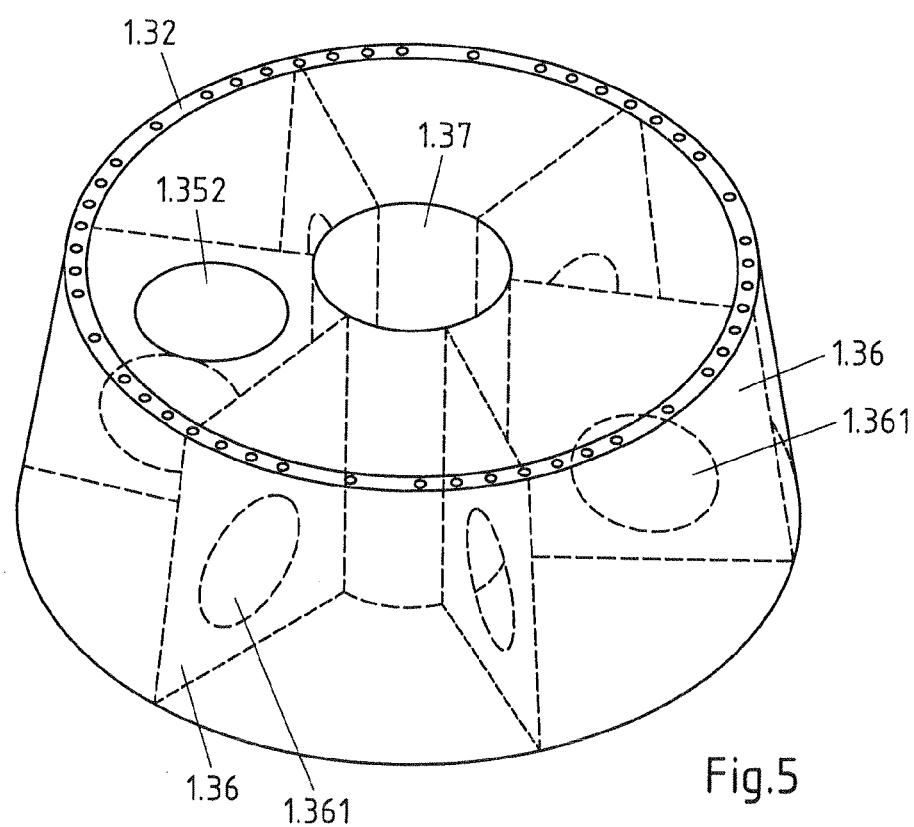
FIG. 5 illustrates the transition body of FIG. 3 with inner parts represented by broken line, in perspective top view.
Figure 6:
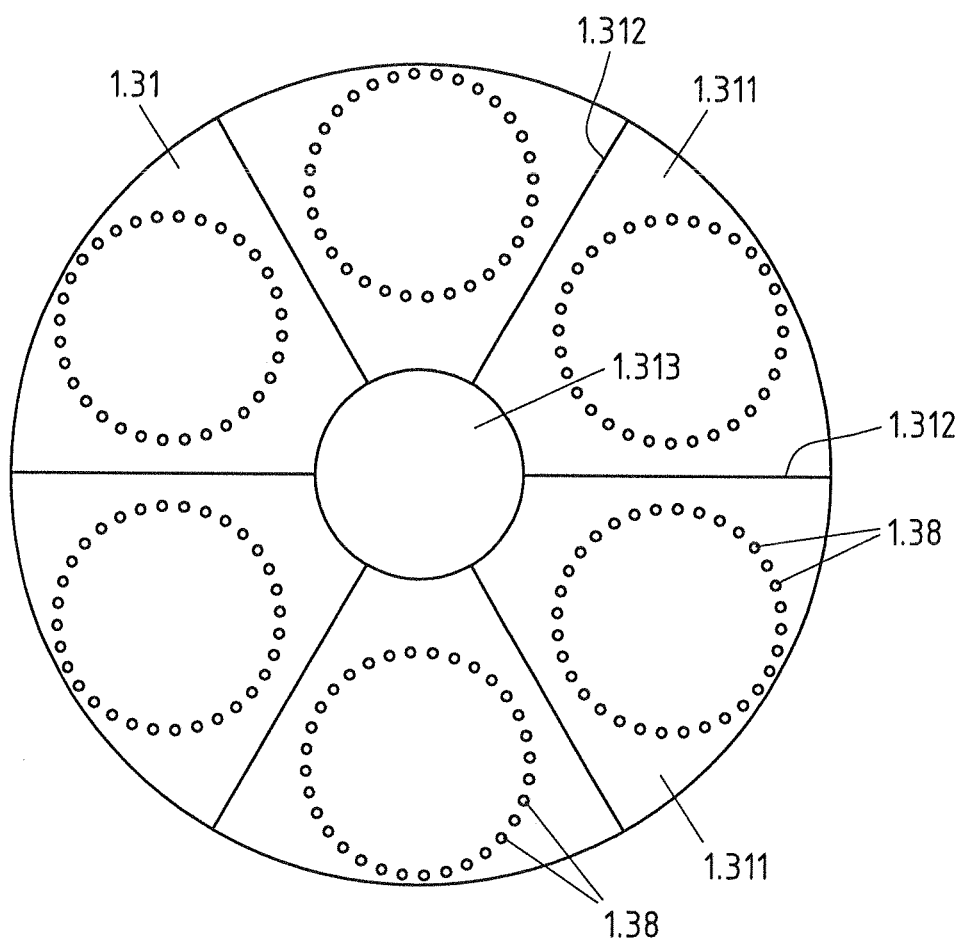
FIG. 6 illustrates the transition body of FIG. 3, in bottom view.

The tower 1 of a wind energy plant 2 as shown in FIG. 1 is composed of a lower part 1.1 having several corner posts and an upper part 1.2 in the form of a tubular tower which is round in cross section.

At the upper end of the tubular tower 1.2 there is mounted a wind energy plant (wind power plant) 2, which can rotate about an essentially vertically extending axis. The wind energy plant 2 comprises a rotor 2.1 with rotor blades 2.2, which can preferably turn about their respective longitudinal axis and thus can be adjusted essentially continuously, and a generator arranged in a gondola housing 2.3, whose shaft is connected, rigid to rotation, by a gearing and a coupling to the rotor 2.1.

The lower tower section 1.1 in the sample embodiment shown here has six corner posts 1.10. But it can also have more or less than six corner posts. In any case, it has at least three corner posts 1.10, whose horizontal spacing from each other increases, starting from the upper tubular tower 1.2, in the direction of the ground or foundation. The preferably essentially straight corner posts 1.10 thus form a three or more legged tower structure, whose legs are spread apart at acute angles from each other. The lower tower section 1.1 can also be called a resolved tower structure.

Each of the corner posts 1.10 is preferably composed of at least three steel pipe profiles 1.11, 1.12 joined together in the lengthwise direction, being provided for this with perforated flanges 1.13 at their connection sites to accommodate bolts (not shown), for example. The flanges 1.13 are configured, for example, as annular flanges. The particular flange or annular flange 1.13 has a plurality of through holes, which are arranged on a common partial circle uniformly spaced apart.

Preferably, the steel pipe profiles 1.11, 1.12 used for the corner posts 1.10 are identical parts, welded together by longitudinal seams or spiral seams. The steel sheets used for their fabrication, being arc-shaped or transformed into a round shape, can be hot-rolled steel sheets with a yield strength of at least 350 N/mm$^2$. However, higher strength steel sheets can also be used to make the steel pipe profiles of the corner posts 1.10, such as steel sheets with a yield strength in the range of 500 to 700 N/mm$^2$.

The steel pipes 1.11, 1.12 of the respective corner post 1.10 preferably have a wall thickness in the range of 5 mm to 30 mm. Their diameter is, e.g., in the range of 500 mm to 1900 mm. Preferably, the steel pipes 1.11, 1.12 used for the corner posts 1.10 are made essentially from straight standard pipes.

The respective annular flange 1.13 is preferably arranged by material bonding at one of the ends of the steel pipe 1.11, 1.12 used to construct a corner post 1.10, for example, by means of fillet welding. Yet a frictional and/or form-fitting connection is also possible between annular flange 1.13 and the associated end of the steel pipe, for example, by screwing, whereupon the end of the steel pipe is provided with an external thread and the annular flange with a corresponding internal thread.

The respective annular flange 1.13 lies in a plane which is orthogonal to the lengthwise axis of the steel pipe.

The corner posts 1.10 are joined together by cross struts 1.15. For this, the same annular flanges 1.13 are used which join together the steel pipes 1.11, 1.12, preferably standard pipes.

The cross struts 1.15 are formed from steel profiles and extend essentially horizontally. Those cross struts 1.15 which are situated at the same height are made as identical parts. The length of the cross struts 1.15 depends on their connection height. With increasing tower height, the length of the cross struts 1.15 connected to the annular flanges 1.13 diminishes.

The tower 1 according to the invention, at least its lower section 1.1, thus has a modular construction making use of standardized steel profiles 1.11, 1.12, 1.15. The cross struts 1.15, for example, are designed as a U-profile. But they can also have a different profile shape, such as an L-profile or a T-profile.

The lower, multi-legged tower section 1.1 is connected by a transition body 1.3 functioning as an adapter to the tubular tower 1.2. The transition body 1.3 is designed as an essentially closed welded structure. It has a bottom and a connection flange (annular flange) disposed above the bottom for connecting the upper tower section, the bottom 1.31 and the connection flange 1.32 being joined together by at least one metal casing sheet 1.33.

Furthermore, the transition body 1.3 is provided with an upper platform 1.35, at whose top side is arranged the connection flange 1.32 serving for the connection of the upper tower section 1.2. The platform 1.35 is likewise joined to the metal casing sheet 1.33. The bottom 1.31 constitutes a lower closure and the platform 1.35 at a vertical spacing from it constitutes an upper closure of the transition body 1.3. The bottom 1.31 has a round or essentially circular circumference, whose diameter is preferably at least 10% larger than the outer diameter of the upper connection flange 1.32 or the outer diameter of the essentially circular platform 1.35. The transition body 1.3 is thus in the shape of a truncated cone. The conical envelope surface 1.33 is preferably composed of two or more sheets or envelope pieces. But alternatively the round or circular bottom 1.31 and the connection flange 1.32 can also have essentially the same outer diameter, so that the envelope surface 1.33 is then cylindrical in shape.

In the bottom 1.31 and in the upper platform (closure plate) 1.35 there are cut out centrally arranged through openings 1.313 and 1.351, which serve as an installation passageway. The through openings 1.313, 1.351 are connected to a cylindrical shaft (pipe section) 1.37. The shaft 1.37 thus emerges into the through openings 1.313, 1.351. The inner diameter of the shaft 1.37 is around 1.2 m, for example.

Inside the transition body 1.3 there are provided inner plates 1.36 for its stiffening. The inner plates 1.36 are welded to the bottom 1.31, the platform 1.35, the envelope surface 1.33 and the shaft 1.37. Preferably, the inner plates 1.36 are oriented essentially vertically and are spaced essentially evenly from each other about the circumference of the cylindrical shaft 1.37.

The radially oriented inner plates 1.36 are provided with through openings 1.361, which serve as an installation passageway. In order to provide access to one of the chambers of the transition body 1.3 bounded by the inner plates 1.36, the upper platform 1.35 has, in addition to the central through opening 1.351, at least one other through opening 1.352 at a radial distance thereof. The diameter of the through openings 1.361, 1.352 is at least 60 cm, preferably at least 90 cm.

On the underside of the bottom of the transition body 1.31 there is provided a number of connection areas 1.34 corresponding to the number of corner posts 1.10. The connection areas 1.34 are angled from each other, so that in the assembled state of the transition body 1.3 the respective connection areas 1.34 rise radially outward. The underside of the bottom 1.31 of the transition body 1.3 thus has a facetted structure. The respective connection area 1.34 is provided with fastening boreholes 1.38 for the connection of a corner post 1.10. The fastening boreholes 1.38 serving to accommodate bolts are arranged on a common partial circle.

The bottom 1.31 is composed of platelike segments 1.311, the particular segment 1.311 having two straight, converging side edges 1.312. Likewise, the upper platform (closure plate) 1.35 can also be composed of several platelike segments, each having straight, converging side edges.

In order to ensure or further increase the required stability of the overall tower 1, additional tension struts 1.17 can be provided, each being fastened in the flange area, so that they run diagonally in the framework defined by two adjacent corner posts 1.10 and two essentially parallel cross struts 1.15.

The tension struts (diagonal struts) 1.17 are formed, for example, from wire cables. The ends of the wire cables 1.17 are secured by suitable fastening means to the through openings of the annular flange 1.13. For purposes of their lengthwise adjustment, the tension struts or wire cables 1.17 can each be provided with a tensioning device (not shown).

The lower tower section 1.1 of the tower 1 according to the invention is thus not designed in a classical lattice mast construction, but rather by use of hollow profiles, preferably standard pipes, having orthogonal connection flanges 1.13, with individual cross and/or diagonal struts 1.15 and 1.17 arranged by detachable fastening means.

The upper tower part 1.2, which is configured as a tubular tower which is round in cross section, starts from a height of around 60 m, for example. It can be configured in conventional, transversely oriented construction and accordingly be composed of several annular pipe segments. The tubular tower 1.2 is preferably designed as a conical steel pipe tower. The height of the overall tower 1 or the hub height of the rotor 2.1 is, for example, around 110 m.

FIG. 7 shows another sample embodiment of the multilegged section 1.1 of a tower of a wind energy plant according to the invention. The upper section of the tower, which is formed as in FIG. 1 from a tubular tower essentially round in cross section, is not shown in FIG. 7.

The lower multilegged tower section 1.1 in this sample embodiment has four corner posts 1.10, each being composed of at least three steel pipe profiles 1.11, 1.12 joined together in the lengthwise direction. The steel pipes 1.11, 1.12 are provided for this at their connection sites with perforated flanges 1.13 to accommodate detachable mechanical connection means, such as bolts. Each of the flanges 1.13 has a plurality of through holes for accommodation of the connection means.

Furthermore, brackets 1.18 can be arranged at the connection sites or ends of the steel pipe profiles 1.11, 1.12. The brackets and the flange 1.13 are welded to the steel pipe 1.11 or 1.12, the bracket 1.18 being oriented essentially perpendicular to the flange 1.13 (see FIG. 8).

The sample embodiment of FIGS. 7 and 8 offers the possibility of cutting to length the ends of the steel pipe profiles 1.11, 1.12 essentially perpendicular (at right angles) to their longitudinal axis, i.e., it is not necessary to bevel the pipe ends. The connection of the cross struts 1.15 to the steel pipes 1.11, 1.12 is then possible without bending the ends of the cross struts 1.15, despite their essentially right-angled cut ends or the essentially perpendicular orientation of the flanges 1.13 with respect to the longitudinal axis of the steel pipe, since in this case they are connected to the brackets 1.18. The brackets 1.18 thus enable an equalizing of the connection angle between cross struts 1.15 and the longitudinal axis of the steel pipe for any given angle of inclination of the longitudinal axis of the steel pipe (longitudinal axis of the corner post).

The diagonal struts 1.17, which in the sample embodiment of FIGS. 7 to 9 are configured as edge parts or rolled profiles, are preferably joined together in their intersection area 1.20. In turn, mechanical detachable connection elements such as bolts are used for the connection or fixation of the diagonal struts 1.17 in the intersection area 1.20. The connection or prefixation of the diagonal struts 1.17 in the intersection area 1.20 can be done already during the prefabrication of the diagonal struts 1.17, which simplifies or shortens the installation of the lattice or framework tower 1.1 at the erection site of the tower according to the invention.

The design of the tower according to the invention is not limited to the sample embodiments shown in the drawing. Instead, many variants are conceivable, which also make use of the invention indicated in the accompanying claims even in a design departing from the sample embodiment shown. Thus, for example, the flanges 1.13 of the corner post pipes 1.11, 1.12 can be connected not to steel cables 1.17, but also to steel profile rods, such as L-shaped profile edge pieces as the diagonal tension struts.

For easier installation of the tower according to the invention, the connection areas 1.34 for the corner posts 1.10 can be spaced apart by spacer pieces from the lower bottom 1.31 of the transition body 1.3. This spacing can be done either externally or internally, and the spacer pieces preferably correspond to the profile of the corner post 1.10 or have a corresponding clear opening. The spacer pieces can have (externally) a length of up to 10 m or extend internally as far as the upper platform (closure plate) 1.35.

For larger wind energy plants, the transition body 1.3 of the invention can be constructed from two or more preferably radially divided symmetrical parts.

The invention claimed is:

1. A transition body arranged between a lower tower section and an upper tower section of a tower for a wind power plant, wherein the lower tower section is constructed from several corner posts configured as hollow profiles and the upper tower section is configured in the form of a tubular tower which is substantially round in cross section, with a bottom and a connection flange disposed above the bottom for connecting the upper tower section, wherein the bottom and the flange serving to connect the upper tower section are joined together by at least one metal casing sheet having a continuously conical surface in the shape of a truncated cone, and wherein at least the connection of the bottom to the at least one metal casing sheet is a welded construction, wherein a number of connection areas are provided on the underside of the bottom, the underside of the bottom comprised of a plurality of closed platelike segments, each closed platelike segment having two straight converging side edges and collectively arranged as a facetted structure, the closed platelike segments corresponding to the number of corner posts of the lower tower section, the connection areas being angled relative to each other so that the respective connection area increases radially outward in the assembled state of the transition body.

2. The transition body of claim 1 wherein the connection flange serving for the connection of the upper tower section is arranged on an upper platform, which is situated above the bottom and is likewise connected to the at least one metal casing sheet, the connecting flange having an outer circumference defining a diameter that is complementary for alignment with the upper tower section.

3. The transition body of claim 2, further comprising:
inner plates configured for stiffening of the transition body wherein the inner plates are welded onto the at least one metal casing sheet and the top side of the bottom.

4. The transition body of claim 3 wherein the inner plates are also welded to the upper platform.

5. The transition body of claim 4 wherein the inner plates run substantially radially and vertically.

6. The transition body of claim 5 wherein the inner plates are welded to the metal casing sheet of a shaft defining a vertical passageway and a tubular shaft.

7. The transition body of claim 6 wherein the inner plates are oriented essentially vertically and are spaced essentially evenly from each other about a circumference of the tubular shaft.

8. The transition body of claim 7 wherein the upper platform has a central through opening and at least one additional through opening at a radial distance thereof.

9. The transition body of claim 7 wherein the inner plates are provided with through openings which serve as an installation passageway.

10. The transition body of claim 1 wherein a particular connection area of the bottom is provided with fastening boreholes arranged on a circle for the connecting of a corner post.

11. The transition body of claim 1 wherein the at least one metal casing sheet defines an envelope surface of the truncated cone.

12. The transition body of claim 1 wherein the continuously conical surface tapers from a first diameter at the bottom to a second diameter at the flange, wherein the connection areas of the corner posts are within the first diameter.

13. A tower for a wind power plant comprises:
a lower tower section;
an upper tower section; and
a transition body arranged between a lower tower section and an upper tower section of a tower for a wind power plant, wherein the lower tower section is constructed from several corner posts configured as hollow profiles and the upper tower section is configured in the form of a tubular tower which is substantially round in cross section, with a bottom and a connection flange disposed above the bottom for connecting the upper tower section, wherein the bottom and the flange serving to connect the upper tower section are joined together by at least one metal casing sheet having a continuously conical surface in the shape of a truncated cone, and wherein at least the connection of the bottom to the at least one metal casing sheet is a welded construction, wherein a number of connection areas are provided on the underside of the bottom, the underside of the bottom comprised of a plurality of closed platelike segments arranged as a facetted structure, the closed platelike segments corresponding to the number of corner posts of the lower tower section, while the connection areas are angled relative to each other so that the respective connection area increases radially outward in the assembled state of the transition body.

14. The tower of claim 13 wherein the respective corner post is composed of several steel pipe profiles joined together in the lengthwise direction, being provided with perforated flanges to accommodate bolts, and the corner posts are joined together by at least one of cross struts and tension struts connected to the flanges.

15. The tower of claim 14 wherein the cross struts are formed from horizontally extending steel profiles.

16. The tower of claim 15 wherein the tension struts are formed from diagonally extending wire cables.

17. The tower of claim 13 wherein the continuously conical surface tapers from a first diameter at the bottom to a second diameter at the flange, wherein the connection areas of the corner posts are within the first diameter.

* * * * *